(No Model.)
N. ROUSSELLE & V. & J. SNUTSEL.
BALL BEARING FOR AXLES.
No. 595,210. Patented Dec. 7, 1897.
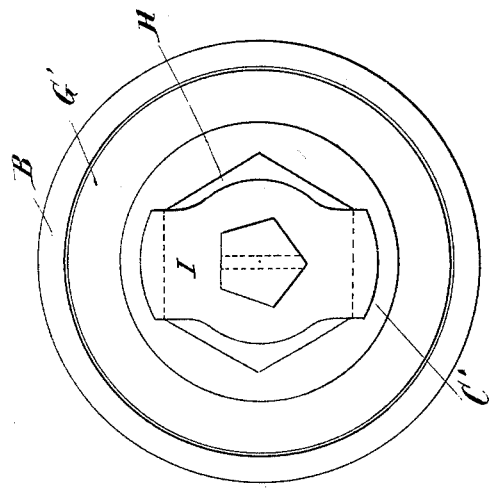
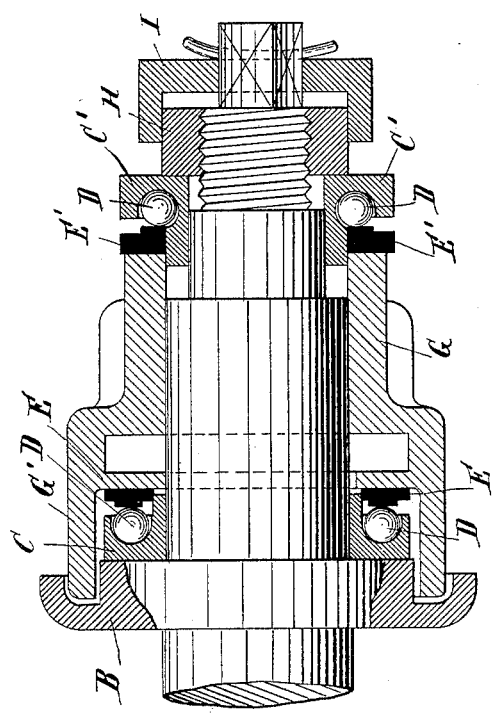
Witnesses
Inventors
N. Rousselle
V. Snutsel
J. Snutsel
by their Attorney

UNITED STATES PATENT OFFICE.

NARCISSE ROUSSELLE, OF VERVIERS, AND VICTOR SNUTSEL AND JEAN SNUTSEL, OF BRUSSELS, BELGIUM.

BALL-BEARING FOR AXLES.

SPECIFICATION forming part of Letters Patent No. 595,210, dated December 7, 1897.

Application filed April 13, 1896. Serial No. 587,408. (No model.) Patented in Belgium January 4, 1895, No. 113,513, and in France January 17, 1895, No. 244,398.

*To all whom it may concern:*

Be it known that we, NARCISSE ROUSSELLE, a citizen of the French Republic, residing in Verviers, and VICTOR SNUTSEL and JEAN SNUTSEL, subjects of the King of the Belgians, residing in Brussels, in the Kingdom of Belgium, have invented certain new and useful Improvements in Ball-Bearings for Axles, (for which Letters Patent have been obtained in Belgium, No. 113,513, dated January 4, 1895, and in France, No. 244,398, dated January 17, 1895, both granted to the said Victor Snutsel and Jean Snutsel,) of which the following is a specification.

In order to avoid jamming and sticking, we have modified the form of the ball-race in order to use as point of application for an interposed ring the extremity of a diameter of the balls directed parallel to the axle; also, we have combined therewith a special form of interposed ring in order that all side thrusts upon this ring resulting from the side friction of the wheel are directed parallel to the axle equally, and have therefore as resultant the force passing through the centers of the balls and directed parallel to the axle. This ring is independent from the axle. Upon the axle itself and on the inner side of the axle-neck we fit a cup, in which the balls run in a race of such a form that diameters drawn through the centers of the balls parallel to the axle terminate at one end in the race and at the other end outside the race. Upon the prolongation of this cup is fitted a loose flat ring, placed with one of its faces against the balls, the contact-points between the balls and this ring being precisely at the extremities of the diameter of the balls parallel to the axle. The other face of this ring is also flat and is submitted to the pressures resulting from the side shocks of the wheel. This flat face, in company with the special form of cup, has the effect of giving as resultant to any side blow a force passing through the center of the balls parallel to the axle. It results that the balls equilibriate this force precisely at their contact-points with their revolution-surfaces, this being the most favorable arrangement for obtaining absolute facility of revolution. For the purpose of reducing the side action operating upon the balls by the fastening of the box we complete the ball-fitting of the axle by using a similar arrangement at each extremity of the box, dividing in this manner between two similar arrangements the side pressure operating upon the balls. In this manner there is avoided the inconvenience which the use of one single box presents of the screw for setting up the ball-bearings, bringing the whole pressure upon the surface of a single ring exposed in this manner to relatively considerable friction.

In the annexed drawings, Figure 1 is a longitudinal section of an axle. Fig. 2 is a view of the end of the axle from the right of Fig. 1.

Upon the axle A and against the shoulder B is the cup C, with balls D. The ball-race in this cup C is disposed in order to retain the balls—that is to say, it surrounds a little more than the half of the circumference of the balls, leaving free one extremity of the diameter of the balls parallel to the axle. The balls are introduced into the race by a small passage (not shown in the drawings) placed upon the exterior side of the cup C. The balls D support against the flat ring E the longitudinal shocks of the box G of the wheel. The drawings show on the other extremity of the axle-neck a similar arrangement, consisting of the washer E' and the cup C', with balls D, the setting of the whole being effected by the nut H and the fixing-clamp I. This clamp is slid over the pentagonal prolongation of the axle-neck, which allows of obtaining a perfect setting by means of one single nut, which may be adjusted to one-thirtieth of a turn of the nut. The drawings show also a special conformation of the box of the wheel for the purpose of protecting the parts of the cup, ring, &c., from the dust on the inner side of the wheel. For this purpose the box G is lengthened by a shoulder G', covering completely the cup, which is therefore arranged in the interior of the axle-box itself, the latter being in a measure closed on the inner side of the wheel by the flange B of the axle.

The arrangement of cups and washers can be applied to any kind of shaft or axle of any vehicle, or even of machines or gearing.

It is sufficient to substitute the ball-bearing described above for the ring-washer generally used upon any axle to take the side thrust. By replacing such ring-washer by a ball-bearing the friction will be considerably diminished and a greater ease of running will be obtained.

We claim as our invention—

The combination of an axle and an axle-box, a cup surrounding said axle having one end plane and perpendicular to the axis of the axle and having in the other end a ball-race, a loose ring surrounding said axle and having its two end faces plane and perpendicular to the axis of said axle, perpendicular bearing-faces on said axle-box and axle respectively for said cup and ring and balls in said ball-race having contact with the race and with the ring respectively at points at opposite ends of diameters through said balls parallel to the axis of the axle substantially as and for the purpose set forth.

In testimony whereof we have signed this specification in the presence of two subscribing witnesses.

NARCISSE ROUSSELLE.
VICTOR SNUTSEL.
JEAN SNUTSEL.

Witnesses:
EMILE GRANDSIRE,
GEORGE BEELE.